Dec. 17, 1968 H. A. SAUNDERS 3,416,837
BRACE FOR CYCLE SADDLE SEATS
Filed March 17, 1967

INVENTOR
HENRY A. SAUNDERS
BY *Charles R. Fay*
ATTORNEY

# United States Patent Office 3,416,837
Patented Dec. 17, 1968

3,416,837
BRACE FOR CYCLE SADDLE SEATS
Henry A. Saunders, Worcester, Mass., assignor to Persons-Majestic Mfg. Co., Worcester, Mass., a corporation of Massachusetts
Filed Mar. 17, 1967, Ser. No. 623,897
3 Claims. (Cl. 297—195)

ABSTRACT OF THE DISCLOSURE

A U-shaped brace for a cycle saddle including a pair of elongated spaced legs, means to pivot the same to the saddle near the closed end of the U, the legs having portions which are bowed outwardly away from the saddle.

---

This invention relates to an improvement in braces for cycle saddle seats. This brace supports the rear portion of a cycle saddle particularly of the elongated type and is secured thereto, there normally being a cross piece or handle at the top of the brace, the brace having a pair of legs and generally being in "U" form and extending downwardly to be supported on the frame adjacent the rear axle of a cycle. The saddle also has a front support or center post which forms no part of the present invention.

The object of the present invention resides in providing the legs of the U-shaped brace with outwardly bowed portions. This has at least two advantages. In the first place, the seat can be shipped attached with respect to the brace because the bowing of the legs allows the seat to be nested between the legs; whereas with the prior art straight legs, this is impossible. This saves time in the assembly of the bicycle and it also results in preventing damage done to the cycle saddle by rubbing the side portions of the plastic or leather saddle covering ripping or ruffling the same when the pieces are roughly handled in the assembly thereof.

Also the bowing outwardly of the legs provides crash bars for the cycle so that when it falls to the ground these bowed portions will strike the ground and save the cycle saddle, pedals, and other parts from damage.

By bowing the legs of the U-shaped member outwardly, a safety construction is presented that protects portions of the person of the user of the cycle.

Other objects and advantages of the invention will appear hereinafter.

Reference is to be had to the accompanying drawings in which.

Figure 1:
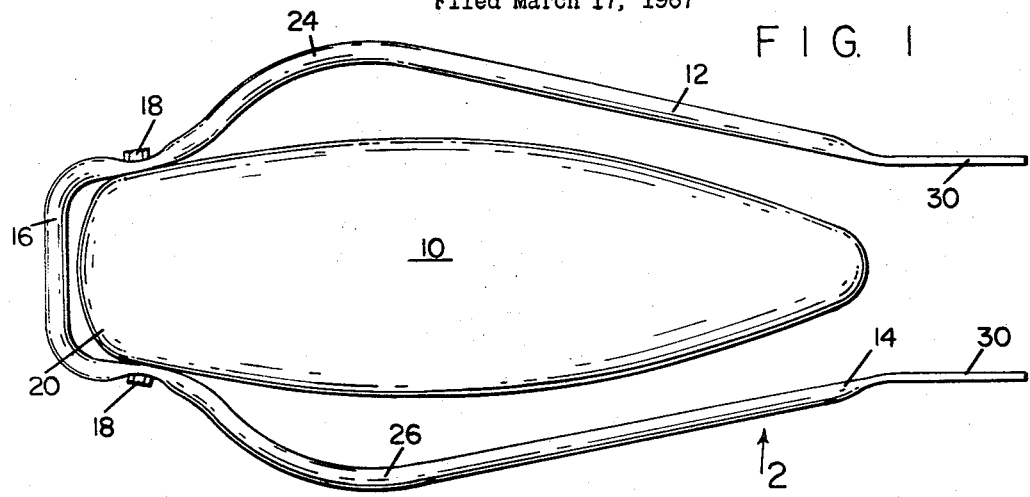
FIG. 1 is a plan view showing the assembly of the novel brace and cycle saddle as it may be shipped.

In carrying out the invention it has been shown as applied to an elongated seat or saddle 10. The brace comprises a generally U-shaped member which has legs 12 and 14 joined by a closed end 16. The closed end 16 is bent out of the general plane of the brace as clearly shown in FIG. 2 and adjacent the bent portion there are provided fasteners such as bolts 18 for securing the brace in pivotal relation with respect to the saddle at the rear end portion thereof which is indicated at 20. These saddles are old and well known and are provided with peripheral flanges such as are illustrated at 22 to which the brace is secured by fasteners 18 as will be understood by those skilled in the art.

The legs 12 and 14 are sharply bowed outwardly as at 24 and 26, and can receive the entire saddle between them.

Figure 2:
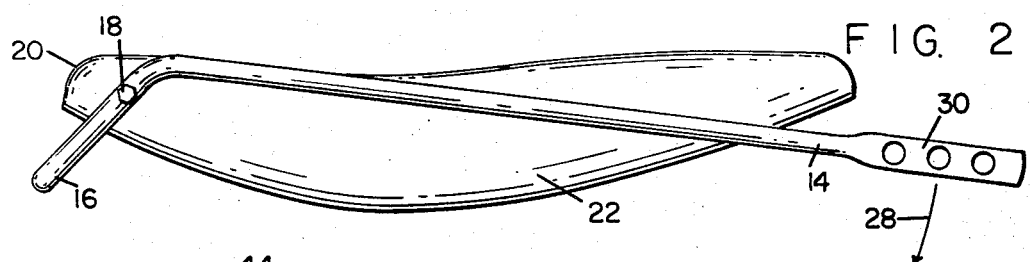
FIG. 2 is a view in side elevation looking in the direction of arrow 2 in FIG. 1.
Figure 3:
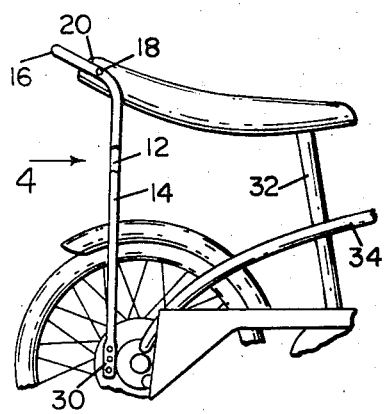
FIG. 3 is a partial view on a smaller scale illustrating the brace supporting the saddle in normal position on the bicycle.
Figure 4:
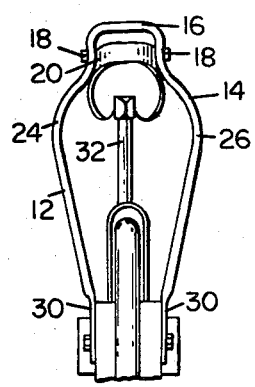
FIG. 4 is a view looking in the direction of arrow 4 in FIG. 3.

With the parts in the position shown in FIGS. 1 and 2, the cycle saddle and its brace can be shipped together which was not possible in the prior art. When the bicycle is to be assembled, the brace is pivoted down in the direction of arrow 28 in FIG. 2 approximately to the position shown in FIG. 3. The lower end portion thereof as at 30 is secured by any means desired with relation to the frame of the bicycle in a well known manner and thus the brace supports the rear portion of the saddle in the usual manner. However by reason of the fact that the legs are sharply bowed outwardly as by the bent-out portions 24 and 26, the same act as crash-bars for the cycle. The parts 16 now act as a handle, etc. for the cycle saddle and in more or less the usual manner.

The reference numeral 32 indicates the front support or center post which can be as usual and 34 represents a portion of the frame of the bicycle as is well known and conventional.

Figure 5:
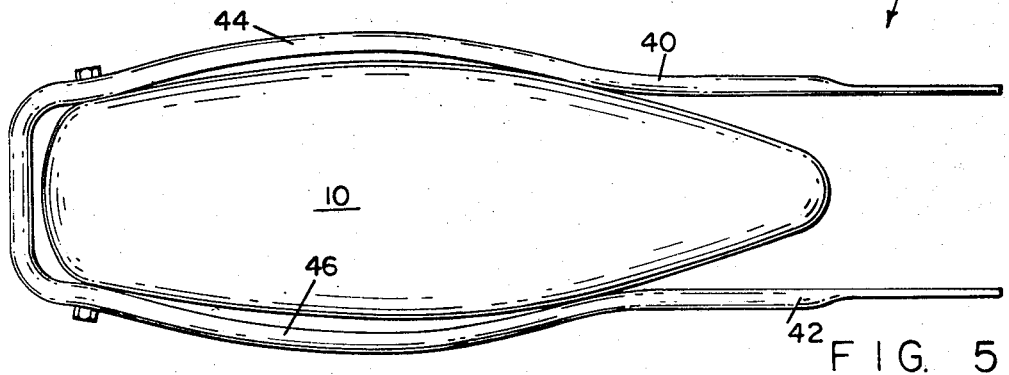
FIG. 5 is a plan view similar to FIG. 1 showing a modification.

The difference of FIG. 5 over FIG. 1 resides in the fact that the legs at 40 and 42 are bent outwardly as at 44 and 46 to a lesser extent as in some cases it may be desirable to provide for less lateral extent so as not to interfere with the proper operation of getting on and off of the bicycle. At the same time however the cycle saddle and the brace can still be shipped compactly and secured together as shown in FIGS. 1 and 5 and also the cycle saddle is protected against damage such as is ordinarily likely to be encountered in rather rough handling of assembly of the parts when they are shipped separately.

Having thus described my invention and the advantages thereof, I do not wish to be limited to the details herein disclosed, otherwise than as set forth in the claims, but what I claim is:

1. The combination of a cycle saddle and a one-piece generally U-shaped brace therefor including a pair of elongated spaced legs with means connecting the legs at one end and having free ends at the other end, means pivoting the brace legs to the saddle adjacent the means connecting the legs, with the saddle between the legs, said saddle having a front portion and a rear portion;

the legs including portions thereof bowed outwardly and spaced apart sufficiently to receive the saddle therebetween in coplanar relation, said pivoting means including means for tightening the saddle to the brace legs substantially rigidly.

2. The combination of claim 1 wherein the bowed legs of the U-shaped brace extend outwardly away from the side edges of the saddle.

3. The combination of claim 1 wherein the bowed legs of the U-shaped brace are bent out on curves extending substantially outwardly laterally of the extreme lateral edge portions of said saddle.

References Cited

UNITED STATES PATENTS 2,568,796   9/1951   Dunlap _____ 280—289 X
3,284,096   11/1966  Hansen et al. _____ 280—289

JAMES T. McCALL, *Primary Examiner.*

U.S. Cl. X.R.
280—289